United States Patent
Keating et al.

(10) Patent No.: US 12,388,584 B2
(45) Date of Patent: Aug. 12, 2025

(54) BANDWIDTH PART FREE SOUNDING REFERENCE SIGNAL FOR POSITIONING FREQUENCY HOPPING

(71) Applicant: Nokia Technologies Oy, Espoo (FI)

(72) Inventors: Ryan Keating, Naperville, IL (US); Hyun-Su Cha, Naperville, IL (US); Tao Tao, Shanghai (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/943,758

(22) Filed: Nov. 11, 2024

(65) Prior Publication Data

US 2025/0112742 A1    Apr. 3, 2025

Related U.S. Application Data

(63) Continuation of application No. PCT/CN2023/076219, filed on Feb. 15, 2023.

(51) Int. Cl.
| | |
|---|---|
| *H04W 72/04* | (2023.01) |
| *H04L 5/00* | (2006.01) |
| *H04W 76/00* | (2018.01) |
| *H04W 88/08* | (2009.01) |

(52) U.S. Cl.
CPC .......... *H04L 5/0012* (2013.01); *H04L 5/0048* (2013.01)

(58) Field of Classification Search
CPC ............................ H04L 5/0012; H04L 5/0048
USPC ....................................................... 370/329
See application file for complete search history.

(56) References Cited

U.S. PATENT DOCUMENTS

| | | |
|---|---|---|
| 2019/0296882 A1 | 9/2019 | Li et al. |
| 2022/0109466 A1 | 4/2022 | Manolakos et al. |
| 2024/0421955 A1* | 12/2024 | Peng ........................ H04L 5/005 |

FOREIGN PATENT DOCUMENTS

| | | | | |
|---|---|---|---|---|
| CN | 113556218 A | 10/2021 | | |
| CN | 113965975 A | 1/2022 | | |
| CN | 115175361 A | 10/2022 | | |
| EP | 4465717 A1 * | 11/2024 | ......... | H04B 7/06968 |
| WO | WO-2024081537 A1 * | 4/2024 | | |

OTHER PUBLICATIONS

"Revised SID on Study on expanded and improved NR positioning", 3GPP TSG RAN Meeting #94e, RP-213588, Agenda Item: 8.6.1, Intel, Dec. 6-17, 2021, 5 pages.

"New WID: NR Positioning Support", 3GPP TSG RAN Meeting #83, RP-190752, Agenda: 9.1.1, Intel Corporation, Mar. 18-21, 2019, 6 pages.

(Continued)

*Primary Examiner* — Maharishi V Khirodhar
(74) *Attorney, Agent, or Firm* — Nokia Technologies Oy

(57) ABSTRACT

The disclosure includes an apparatus, having: means for receiving, from a network entity, configuration information to indicate a window which is bandwidth-part free; and means for transmitting, to the network entity, a sounding reference signal in frequency hopping within the indicated window. The disclosure also includes a method which may include receive, from a network entity, configuration information to indicate a window which is bandwidth-part free. The method may also include transmitting, to the network entity, a sounding reference signal in frequency hopping within the indicated window.

16 Claims, 6 Drawing Sheets

(56) References Cited

OTHER PUBLICATIONS

"Revised WID on NR Positioning Enhancements", 3GPP TSG RAN Meeting #91e, RP-210897, Agenda: 9.7.25, Intel Corporation, Mar. 16-26, 2022, 6 pages.

"Revised WID on support of reduced capability NR devices", 3GPP TSG RAN Meeting #92e, RP-211574, Agenda: 9.7.1.7, Ericsson, Jun. 14-18, 2021, 6 pages.

"3rd Generation Partnership Project; Technical Specification Group Radio Access Network; NR; Requirements for support of radio resource management (Release 18)", 3GPP TS 38.133, V18.0.0, Dec. 2022, 5854 pages.

"Positioning for Reduced Capabilities UEs", 3GPP TSG RAN WG1 #111, R1-2212126, Agenda Item: 9.5.3, Qualcomm Incorporated, Nov. 14-18, 2022, pp. 1-16.

"Msc-generator", Sourceforge, Retrieved on Oct. 30, 2024, Webpage available at : https://sourceforge.net/projects/msc-generator/.

"3rd Generation Partnership Project; Technical Specification Group Radio Access Network; NG-RAN; NR Positioning Protocol A (NRPPa) (Release 17)", 3GPP TS 38.455, V17.3.0, Dec. 2022, pp. 1-201.

"3rd Generation Partnership Project; Technical Specification Group Radio Access Network; LTE Positioning Protocol (LPP) (Release 17)", 3GPP TS 37.355, V17.3.0, Dec. 2022, pp. 1-348.

"3rd Generation Partnership Project; Technical Specification Group Radio Access Network; NR; Physical layer procedures for data (Release 17)", 3GPP TS 38.214, V17.4.0, Dec. 2022, pp. 1-231.

International Search Report and Written Opinion received for corresponding Patent Cooperation Treaty Application No. PCT/CN2023/076219, dated Nov. 8, 2023, 7 pages.

"Remaining details on PUSCH hopping procedure", 3GPP TSG-RAN WG1 #NR1801, R1-1800940, Agenda Item: 7.3.3.4, Nokia, Jan. 22-26, 2018, 5 pages.

Examiner's Tentative Rejection received for corresponding Taiwanese Patent Application No. 113100933, dated Oct. 4, 2024, 12 pages of Tentative Rejection and 5 pages of translation available.

"The potential solutions for RedCap UE for positioning measurement", 3GPP TSG-RAN WG1 #111, R1-2212197, Agenda Item: 9.5.3, MediaTek Inc, Nov. 14-18, 2022, 3 pages.

* cited by examiner

BANDWIDTH PART FREE SOUNDING REFERENCE SIGNAL FOR POSITIONING FREQUENCY HOPPING

RELATED APPLICATION

This application is a continuation of PCT International Procedure Application No. PCT/CN2023/076219, filed on 15 Feb. 2023, which is incorporated herein by reference in its entirety.

FIELD

Some example embodiments may generally relate to mobile or wireless telecommunication systems, such as Long-Term Evolution (LTE) or fifth generation (5G) new radio (NR) access technology, or 5G beyond, or other communications systems. For example, certain example embodiments may relate to apparatuses, systems, and/or methods for bandwidth part (BWP) free sounding reference signal (SRS) for positioning frequency hopping.

BACKGROUND

Examples of mobile or wireless telecommunication systems may include the Universal Mobile Telecommunications System (UMTS) Terrestrial Radio Access Network (UTRAN), LTE Evolved UTRAN (E-UTRAN), LTE-Advanced (LTE-A), MulteFire, LTE-A Pro, and/or fifth generation (5G) radio access technology or NR access technology. 5G wireless systems refer to the next generation (NG) of radio systems and network architecture. 5G network technology is mostly based on new radio (NR) technology, but the 5G (or NG) network can also build on E-UTRAN radio. It is estimated that NR may provide bitrates on the order of 10-20 Gbit/s or higher, and may support at least enhanced mobile broadband (eMBB) and ultra-reliable low-latency communication (URLLC) as well as massive machine-type communication (mMTC). NR is expected to deliver extreme broadband and ultra-robust, low-latency connectivity and massive networking to support the IoT.

SUMMARY

Some example embodiments may be directed to a method. The method may include receiving, from a network entity, configuration information to indicate a window which is bandwidth-part free. The method may also include transmitting, to the network entity, a sounding reference signal in frequency hopping within the indicated window.

Other example embodiments may be directed to an apparatus. The apparatus may include at least one processor and at least one memory including computer program code. The at least one memory and computer program code may be configured to, with the at least one processor, cause the apparatus at least to receive, from a network entity, configuration information to indicate a window which is bandwidth-part free. The apparatus may also be caused to transmit, to the network entity, a sounding reference signal in frequency hopping within the indicated window.

Other example embodiments may be directed to an apparatus. The apparatus may include means for receiving, from a network entity, configuration information to indicate a window which is bandwidth-part free. The apparatus may also include means for transmitting, to the network entity, a sounding reference signal in frequency hopping within the indicated window.

In accordance with other example embodiments, a non-transitory computer readable medium may be encoded with instructions that may, when executed in hardware, perform a method. The method may include receiving, from a network entity, configuration information to indicate a window which is bandwidth-part free. The method may also include transmitting, to the network entity, a sounding reference signal in frequency hopping within the indicated window.

Other example embodiments may be directed to a computer program product that performs a method. The method may include receiving, from a network entity, configuration information to indicate a window which is bandwidth-part free. The method may also include transmitting, to the network entity, a sounding reference signal in frequency hopping within the indicated window.

Other example embodiments may be directed to an apparatus that may include circuitry configured to measure, at the apparatus, a radio altimeter signal. The apparatus may also include circuitry configured to receive, from a network entity, configuration information to indicate a window which is bandwidth-part free. The apparatus may also include circuitry configured to transmit, to the network entity, a sounding reference signal in frequency hopping within the indicated window.

Certain example embodiments may be directed to a method. The method may include providing configuration information to a user equipment to indicate a window which is bandwidth-part free for uplink transmission. The method may also include receiving, an uplink sounding reference signal in frequency hopping transmitted within the indicated window from the user equipment. According to certain example embodiments, the sounding reference signal may be received without a bandwidth part.

Other example embodiments may be directed to an apparatus. The apparatus may include at least one processor and at least one memory including computer program code. The at least one memory and computer program code may be configured to, with the at least one processor, cause the apparatus at least to provide configuration information to a user equipment to indicate a window which is bandwidth-part free for uplink transmission. The apparatus may also be caused to receive, an uplink sounding reference signal in frequency hopping transmitted within the indicated window from the user equipment. According to certain example embodiments, the sounding reference signal may be received without a bandwidth part.

Other example embodiments may be directed to an apparatus. The apparatus may include means for providing configuration information to a user equipment to indicate a window which is bandwidth-part free for uplink transmission. The apparatus may also include means for receiving, an uplink sounding reference signal in frequency hopping transmitted within the indicated window from the user equipment. According to certain example embodiments, the sounding reference signal may be received without a bandwidth part.

In accordance with other example embodiments, a non-transitory computer readable medium may be encoded with instructions that may, when executed in hardware, perform a method. The method may include providing configuration information to a user equipment to indicate a window which is bandwidth-part free for uplink transmission. The method may also include receiving, an uplink sounding reference signal in frequency hopping transmitted within the indicated window from the user equipment. According to certain example embodiments, the sounding reference signal may be received without a bandwidth part.

Other example embodiments may be directed to a computer program product that performs a method. The method may include providing configuration information to a user equipment to indicate a window which is bandwidth-part free for uplink transmission. The method may also include receiving, an uplink sounding reference signal in frequency hopping transmitted within the indicated window from the user equipment. According to certain example embodiments, the sounding reference signal may be received without a bandwidth part.

Other example embodiments may be directed to an apparatus that may include circuitry configured to provide configuration information to a user equipment to indicate a window which is bandwidth-part free for uplink transmission. The apparatus may also include circuitry configured to receive, an uplink sounding reference signal in frequency hopping transmitted within the indicated window from the user equipment. According to certain example embodiments, the sounding reference signal may be received without a bandwidth part.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for bandwidth part (BWP) free sounding reference signal (SRS) for positioning frequency hopping.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments. Further, the terms "base station", "cell", "node", "gNB", "network" or other similar language throughout this specification may be used interchangeably. Additionally, the terms broadcast, transmit, or other similar language, throughout this specification may be used interchangeably.

As used herein, "at least one of the following: <a list of two or more elements>" and "at least one of <a list of two or more elements>" and similar wording, where the list of two or more elements are joined by "and" or "or," mean at least any one of the elements, or at least any two or more of the elements, or at least all the elements.

The technical specification of the $3^{rd}$ Generation Partnership Project (3GPP) describes native positioning support in NR, and has presented various positioning solutions including, for example, downlink time difference of arrival (DL-TDOA), uplink time difference of arrival (UL-TDOA), downlink angle of departure (DL-AoD), uplink angle of arrival (UL-AoA), and multi-cell round trip time (Multi-RTT). 3GPP has started NR positioning enhancement work, focusing on increasing accuracy, reducing latency, and increasing efficiency (e.g., low complexity; low power consumption; and/or low overhead) based on Rel-16 solutions. Reduced capability (RedCap) devices have been designed and standardized in Rel-17. There, RedCap NR devices have been designed with relatively longer battery life as compared to Internet of Things (IoT) devices.

Figure 1:
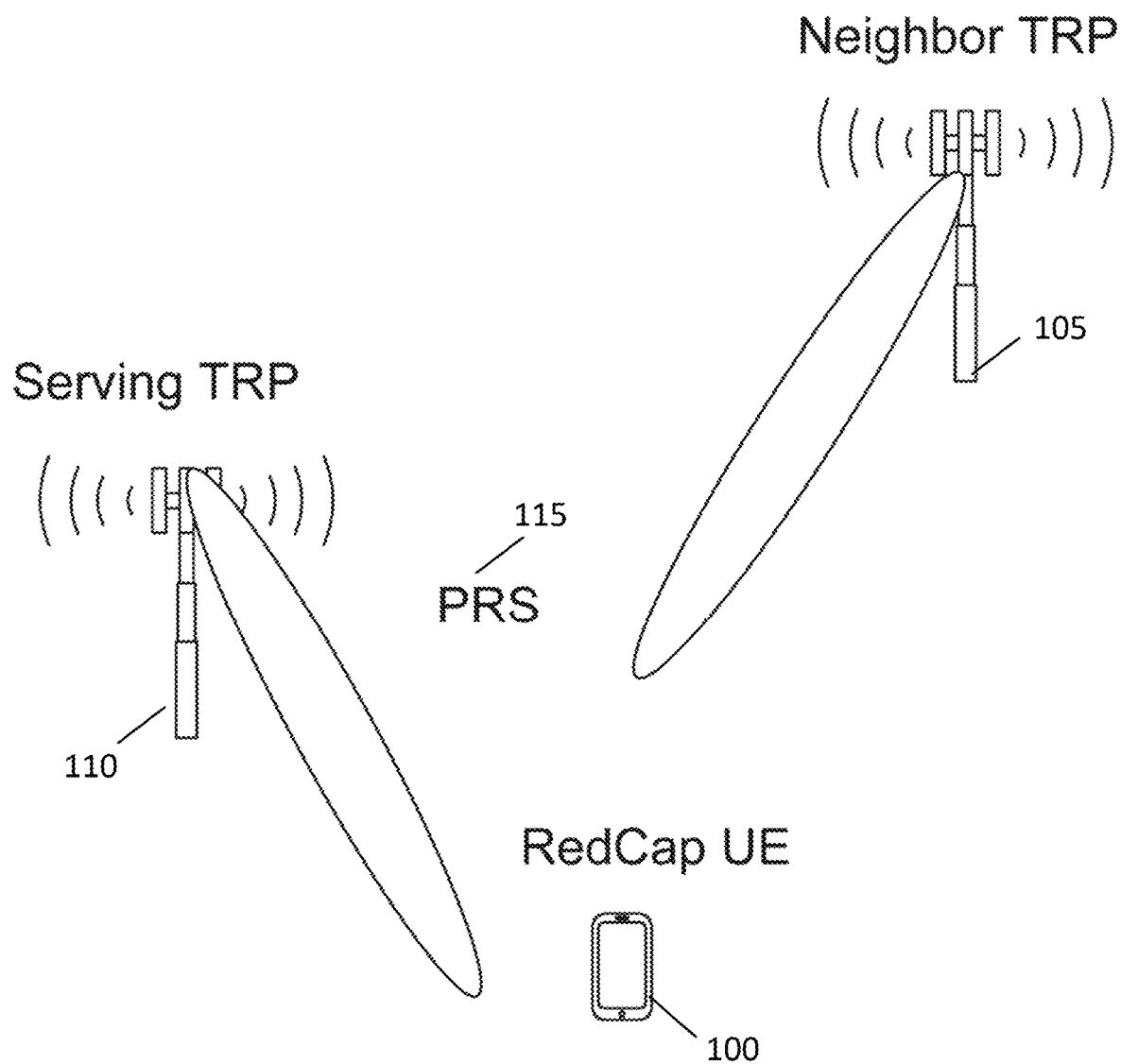
FIG. 1 illustrates an example implementation of RedCap positioning.

FIG. 1 illustrates an example implementation of RedCap positioning. In particular, FIG. 1 illustrates a RedCap user equipment (UE) 100 measuring positioning reference signals (PRS) 115 from a neighbor transmission reception point (TRP) 105 and/or a serving TRP 110 for positioning. According to 3GPP, positioning support for RedCap UEs may consider evaluation of positioning performance of existing positioning procedures and measurements with RedCap UEs. A possible enhancement for RedCap UEs positioning may include allowing PRS/SRS frequency hopping to increase the effective bandwidth (BW) for positioning while keeping the instantaneous BW within the RedCap maximum (e.g., 20 MHz for frequency range 1 (FR1), 100 MHz for frequency range 2 (FR2)).

In UL frequency hopping (or BW switching) for the SRS, it may be assumed that the UE needs to have some resource element (RE) or resource blocks (RBs) that overlap between each hop in order to perform phase alignment between the hops. If the alignment does not occur, the gNB may be unable to successfully combine the BW of the hops to take advantage of the overall total BW (aggregated by multiple hops).

Figure 2:
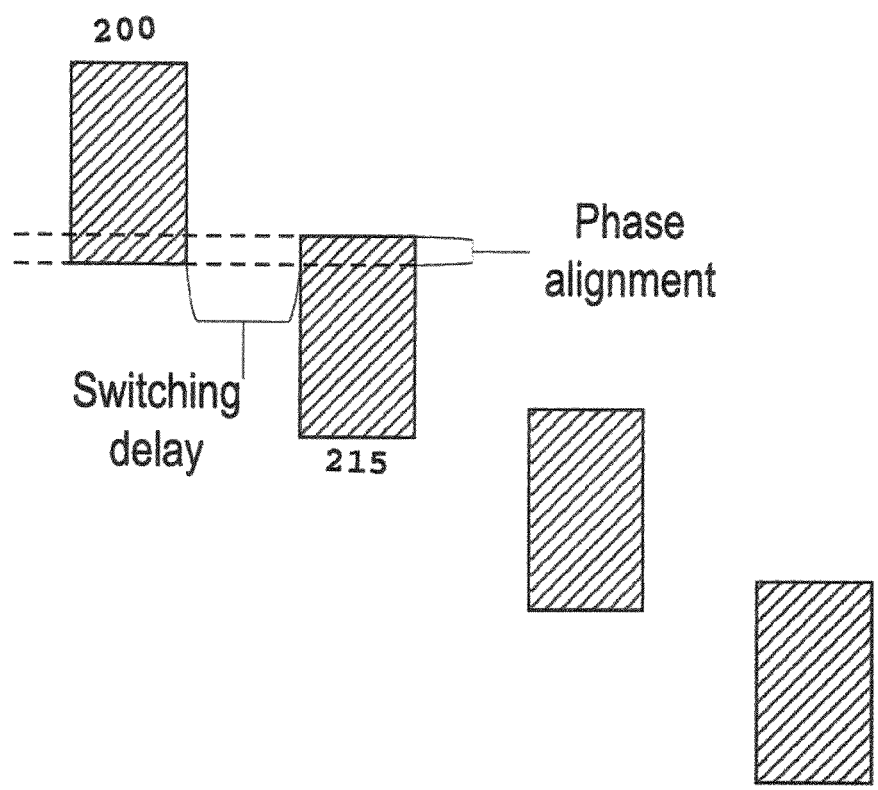
FIG. 2 illustrates an example phase alignment for SRS frequency hopping.

FIG. 2 illustrates an example phase alignment for SRS frequency hopping. As illustrated in FIG. 2, there is a switching delay between each hop 200 to 215, and phase alignment is performed between each hop 200 to 215 based on the overlap between the hops. Thus, as illustrated in FIG. 2, UE behavior includes BWP switching between the hops, which may be time consuming.

As specified in 3GPP and further shown in Table 1 below, downlink control information (DCI) and timer-based BWP switching requirements are provided. As shown in Table 1, more than a few ms may be needed for a UE to complete SRS frequency hopping. For example, a UE with a 15 kHz sub-carrier spacing (SCS) may need over 12 ms to transmit five 20 MHz hops (if the UE is supporting type 2). This may be time consuming and lead to issues with UE speed when positioning estimation is needed. Thus, as described herein, certain example embodiments may provide a way to perform SRS frequency hopping without the need for long switching times shown in Table 1. In other words, certain example embodiments may not necessarily remove the need for a switching time, but rather allow for smaller values to be used instead.

TABLE 1

DCI and timer-based BWP switching requirements

| $\mu$ | NR Slot length (ms) | BWP switch delay $T_{BWPswitchDelay}$ (slots) | |
|---|---|---|---|
| | | Type 1$^{Note\ 1}$ | Type 2$^{Note\ 1}$ |
| 0 | 1 | 1 | 3 |
| 1 | 0.5 | 2 | 5 |
| 2 | 0.25 | 3 | 9 |
| 3 | 0.125 | 6 | 18 |

$^{Note\ 1}$Depends on UE capability.
Note 2:
If the BWP switch involves changing of SCS, the BWP switch delay is determined by the larger one between the SCS before BWP switch and the SCS after BWP switch.

In view of the drawings presented in the current specifications of 3GPP noted above, certain example embodiments may provide the ability to transmit SRS for positioning frequency hopping without the need for BWP switching. This ability may also be called fast RF switching. For instance, according to certain example embodiments, the RedCap UE may perform SRS for positioning frequency hopping. The RedCap UE may also be configured with a BWP-less window (BLW) to transmit the SRS for positioning frequency hopping. The configuration may include one or more of the following: starting slot/symbol of the BLW; starting slot/symbol of the first hop of the SRS transmission in the BLW; ending slot/symbol of the BLW; duration of the BLW; periodicity; initial frequency location of the first hop; number of hops to perform in the BLW; time gap between hops in the BLW; frequency overlap between hops in the BLW; and BW of each hop.

Figure 3:
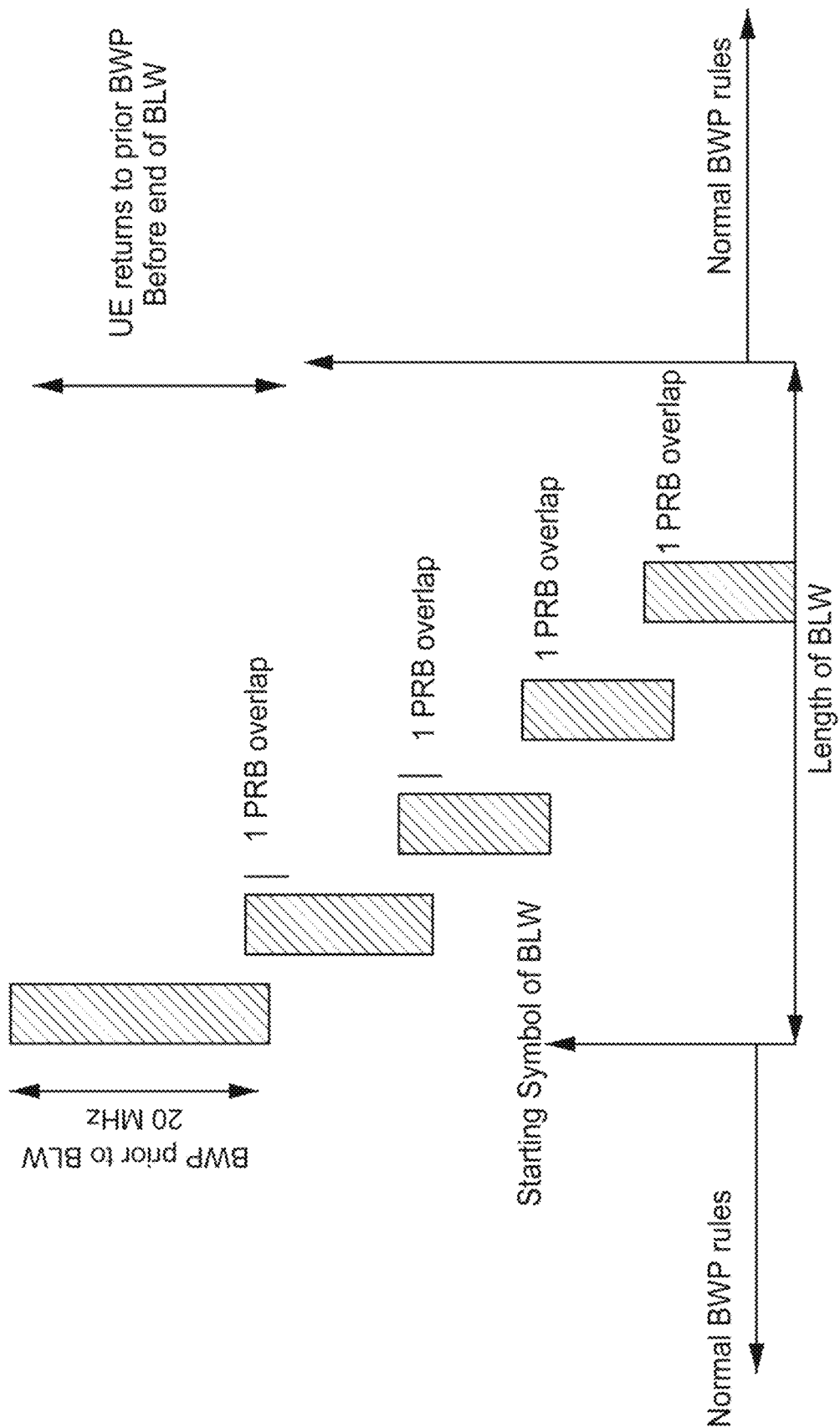
FIG. 3 illustrates an example bandwidth part-less window (BLW) procedure, according to certain example embodiments.

FIG. 3 illustrates an example BLW procedure, according to certain example embodiments. In certain example embodiments, the BLW may apply to RRC inactive or RRC idle mode. As discussed in more detail herein, in these modes, the configuration may also include a priority and/or interaction information with discontinuous reception (DRX) and/or paging. In some example embodiments, there may be one or more mid-point(s) where the UE returns to the prior BWP that it is configured with to check for any DL signal that could interrupt the on-going SRS frequency hopping (e.g., for higher priority data). In further example embodiments, the BLW configuration may be determined by the network (e.g., gNB or LMF) while taking the device and gNB/TRPs capability into account.

As further illustrated in FIG. 3, in some example embodiments, the UE may operate by following normal rules (e.g., Rel-17 specified behavior) for how the UE should operate when it has a configured BWP. In other words, before the start of BLW, the UE may have already been configured with BWP, which the UE may use to monitor a set of channels based on that BWP, and follows a configured switching time. Once the UE enters BLW, it may start at a particular symbol and slot. During BLW, the UE performs hopping with an overlap (e.g., at least 1 PRB overlap) in the frequency domain between hops. Once the hopping has been completed, the UE may return to operating under normal BWP rules (e.g., what the BPW UE was configured with before BLW; BWP rules related to already specified behavior for how much time the UE needs to switch, and what signals in general the UE needs to monitor). For instance, as illustrated in FIG. 3, the UE may return to prior BWP (i.e., previously configured BWP) before the end of BLW.

According to certain example embodiments, the BLW may be configured by the gNB over a radio resource control (RRC) protocol, or by a location management function (LMF) via an LTE positioning protocol (LPP) with coordination with the gNB (e.g., using NR positioning protocol a (NRPPa)). The BLW may be dynamically activated by, for example, a medium access control-control element (MAC CE). For example, the UE may be configured with the BLW at some point in time, but the UE may not use the BLW until the UE receives an additional signal/indication from the network (i.e., gNB). The network may instruct the UE to start using the (pre)-configured BLW. Thus, according to certain example embodiments, the UE may be triggered by the network to use (i.e., activate) the BLW. The BLW may also be implicitly deactivated. For example, once the SRS configuration becomes invalid, the BLW may be implicitly deactivated.

In certain example embodiments, the BLW configuration (or part of the BLW configuration) may be shared with neighboring gNBs from the LMF as part of an UL measurement configuration/request. Furthermore, during the BLW, the UE behavior may be different than the normal UE behavior in terms of receiving/transmitting other signals. Namely, certain signals and channels may be dropped by the UE on the active BWP that the UE is configured with prior to the start of the BLW. In certain example embodiments, different options or modes for how the UE drops signals and channels may be provided depending on whether the UE is in RRC-connected mode or RRC-inactive/idle mode.

When the UE is in RRC-connected mode, the UE may, in a first option/mode, drop (or skip or not be expected to measure) all DL and UL signals and channels other than SRS during the BLW. In certain example embodiments, this option/mode may be a default UE behavior if it is not part of the configuration by the gNB or LMF. In a second option/mode, the UE may drop (or skip or not be expected to measure) all DL and UL signals and channels other than SRS except synchronization signal block (SSB) during the BLW. In a third option/mode, the UE may drop (or skip or not be expected to measure) all non-dynamically scheduled signals and channels (i.e., non-physical downlink shared channel (PDSCH) or physical uplink shared channel (PUSCH) dynamically scheduled). In this third option/mode, to dynamically schedule may refer to, for example, physical downlink control channel (PDCCH) and the PDSCH scheduled by DCI formats 1_1 or 1_2 with a priority indicator field in the corresponding DCI format set to 1. Alternatively, in other example embodiments, the dynamic schedule may refer to configured grant PUSCH or semi-persistent scheduling (SPS) in DL. In a fourth option/mode, the UE may not be expected to measure or monitor all DL signals, but the UE may transmit all UL signals (i.e., reference signals and channels). According to certain example embodiments, in the second and third options/modes, if the UE does not need to transmit/receive a higher priority signal/channel than SRS, the UE may drop either part or all of the SRS frequency hopping transmissions.

When the UE is in RRC-inactive/idle mode, the UE may drop (or skip) paging reception (and also early paging indicator (EPI) reception), and may instead transmit SRS during the BLW. When the UE is in RRC-inactive/idle mode, the UE may also stop inter/intra frequency measurements during the BLW. Additionally, when the UE is in RRC-inactive/idle mode, the UE may stop SRS transmission when the BLW is (partially) overlapped with a discontinuous reception (DRX) on-duration. In certain example embodiments, any of the operations described above which are performed when the UE is in RRC-inactive/idle mode may be performed individually or in any combination.

According to certain example embodiments, the various options described above with respect to the UE being in RRC-connected mode and RRC-inactive/idle mode may be configurable to the UE by the gNB or LMF (e.g., with RRC or MAC CE signaling), or subject to UE capability. That is, the various options/operations of the UE may depend on how they are configured to the UE by the gNB or LMF, or on specific use cases or deployment options of the UE. For example, the first operation/mode may be configured if positioning services have the highest priority but options/modes 2-4 may be configured if there are other things that have higher priority than positioning services or are less tolerant to delays. In some example embodiments, the gNB may also decide which option would have a higher priority over any other option.

In certain example embodiments, the UE behavior, assuming that there are no conflicts as described above, inside the BLW may be to transmit the SRS over the number of hops without changing the BWP configuration. The UE may perform fast radio frequency (RF) switching between the hops while not changing the BWP configuration. After the UE has performed the hops, the UE may realign to the BWP configuration prior to the BLW by the time the BLW ends. At this point, the UE may resume normal UE operations for monitoring/receiving/transmitting signals and channels (see FIG. 3).

Figure 4:
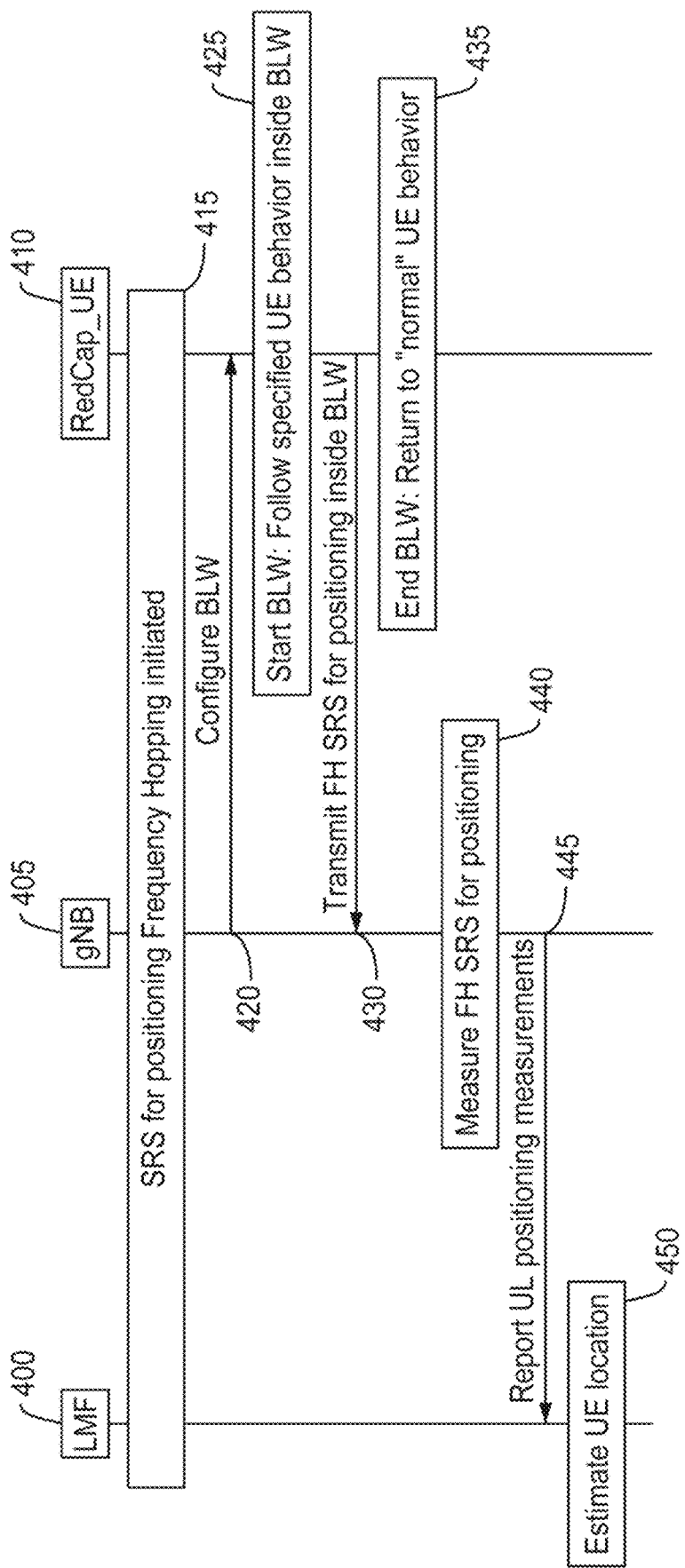
FIG. 4 illustrates an example signaling diagram, according to certain example embodiments.

FIG. 4 illustrates an example signaling diagram, according to certain example embodiments. As illustrated in FIG. 4, at 415, SRS for positioning frequency hopping may be initiated between the LMF 400, gNB 405, and RedCap UE 410. At 420, the gNB 465 may configure the BLW to the RedCap UE 410. However, in other example embodiments, the LMF 400 may configure the BLW to the RedCap UE 410 using, for example, LPP. At 425, the BLW may start, and the RedCap UE 410 may follow the specified UE behavior inside the BLW. For instance, the specified UE behavior may include any of the options/modes or operations described above depending on whether the UE is in RRC-connected mode or RRC-inactive/idle mode. At 430, the RedCap UE 430 may transmit a frequency hopped (FH) SRS for positioning within a window defined by the BLW. In some example embodiments, the window defined by the BLW may include a time and a frequency component. In other words, the RedCap UE 410 may transmit FH SRS for positioning inside the BLW. At 435, the RedCap UE 410 may return to normal UE behavior once the BLW ends. As described above, the normal UE behavior may refer to the UE behavior for BWP operations that have already been specified (e.g., Rel-17 and earlier NR). For example, the RedCap UE 410 may follow the configured BWP (previously configured to the RedCap UE), the required BWP switching times noted above, and transmitting/receiving signals/channels according to an already specified UE behavior.

Figure 5:
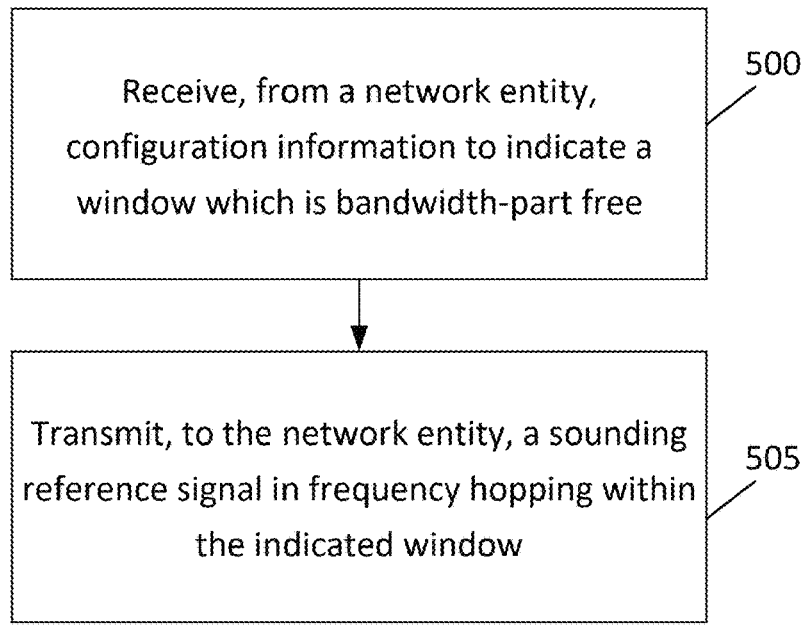
FIG. 5 illustrates an example flow diagram of a method, according to certain example embodiments.

FIG. 5 illustrates an example flow diagram of a method, according to certain example embodiments. In an example embodiment, the method of FIG. 5 may be performed by a network entity, or a group of multiple network elements in a 3GPP system, such as LTE or 5G-NR. For instance, in an example embodiment, the method of FIG. 5 may be performed by a UE similar to one of apparatuses 10 or 20 illustrated in FIG. 7.

According to certain example embodiments, the method of FIG. 5 may include, at 500, receiving, from a network entity, configuration information to indicate a window which is bandwidth-part free. The method may also include, at 505, transmitting, to the network entity, a sounding reference signal in frequency hopping within the indicated window.

According to certain example embodiments, the indication may configure the apparatus to dynamically or implicitly activate or deactivate the window. According to some example embodiments, the configuration information comprises at least one of a starting slot or symbol of the window, a starting slot or symbol of a first hop of the sounding reference signal in the window, an ending slot or symbol of the window, a time duration of the window, a periodicity of the window, an initial frequency location of a first hop, a number of hops to perform in the window, a mode operation number indicating different dropping rules between the sounding reference signal and other downlink or uplink channels or signals, or indicating a radio resource control state, sounding reference signal configuration information, a time gap between hops in the window, a frequency overlap between hops in the window, or a bandwidth of each hop in the window.

In certain example embodiments, the method may further include switching to operate under a prior activated bandwidth part rules within the window once the window has ended or once the transmission of the sounding reference signal has completed before the window ends. In some example embodiments, the method may include operating in at least one of a radio resource control connected mode, a radio resource control inactive mode, or a radio resource control idle mode within the window. In other example embodiments, in the radio resource control connected mode, the method may further include dropping all downlink and uplink signals and channels other than the sounding reference signal during the window, dropping all the downlink and uplink signals and channels other than the sounding reference signal except a synchronization signal block during the window, dropping all non-dynamically scheduled signals and channels, or transmitting all uplink signals and channels.

According to certain example embodiments, all the downlink and uplink signals and channels other than the sounding reference signal during the window may be dropped when a dropping rule is not configured from the network entity. According to some example embodiments, in the radio resource control inactive mode, the method may further include dropping a paging reception, and transmit the sounding reference signal during the window, stopping inter or intra frequency measurements during the window, or stopping the sounding reference signal transmission when the window at least partially overlaps with a discontinuous reception on-duration.

Figure 6:
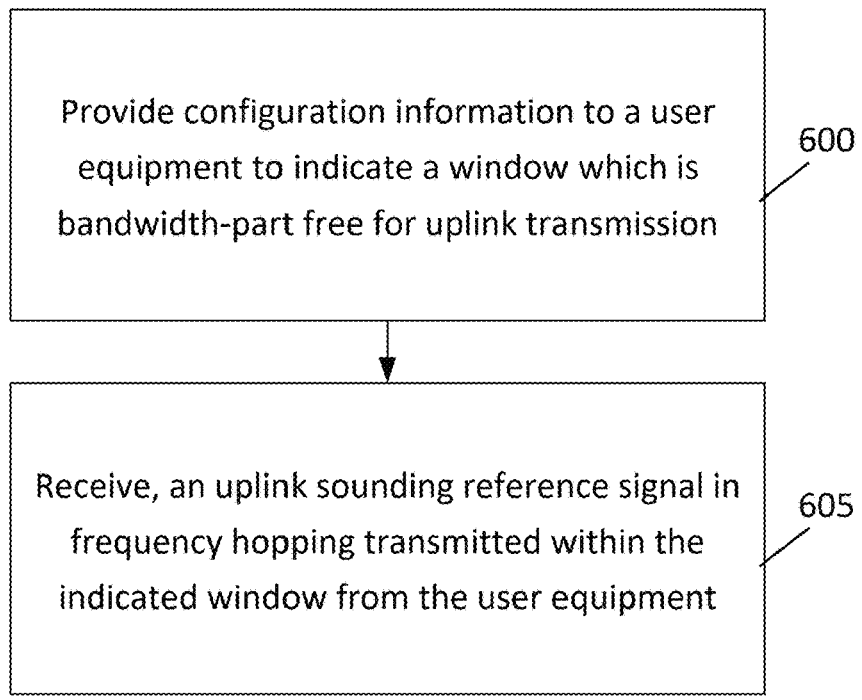
FIG. 6 illustrates an example flow diagram of another method, according to certain example embodiments.

FIG. 6 illustrates an example of a flow diagram of another method, according to certain example embodiments. In an example embodiment, the method of FIG. 6 may be performed by a network entity, or a group of multiple network elements in a 3GPP system, such as LTE or 5G-NR. For instance, in an example embodiment, the method of FIG. 6 may be performed by a network, cell, gNB, LMF, or any other device similar to one of apparatuses 10 or 20 illustrated in FIG. 7.

According to certain example embodiments, the method of FIG. 6 may include, at 600, providing configuration information to a user equipment to indicate a window which is bandwidth-part free for uplink transmission. The method may also include, at 605, receiving, an uplink sounding reference signal in frequency hopping transmitted within the indicated window from the user equipment. According to certain example embodiments, the sounding reference signal may be received without a bandwidth part.

According to certain example embodiments, the method may also include receiving a request from a network element to provide to the user equipment with the configuration information of the window, and receiving a request from the user equipment to provide the configuration information of the window to the user equipment. According to some example embodiments, the configuration comprises at least one of a starting slot or symbol of the window, a starting slot or symbol of a first hop of the reference signal in the window, an ending slot or symbol of the window, a duration of the window, a periodicity of the window, an initial frequency location of a first hop, a number of hops to perform in the window, a mode operation number indicating different dropping rules between the sounding reference signal and other downlink or uplink channels or signals, or indicating a radio resource control state, a time gap between hops in the window, a frequency overlap between hops in the window, or a bandwidth of each hop in the window.

In certain example embodiments, the user equipment may be configured over a radio resource control protocol or via a Long-Term Evolution positioning protocol. In some example embodiments, configure the window to be dynamically activated, and implicitly deactivated without an explicit indication. In other example embodiments, the window may be shared with one or more neighboring element within a network.

According to certain example embodiments, the method may further include configuring the user equipment to operate in one of a radio resource control connected mode, a radio resource control inactive mode, or a radio resource control idle mode within the window. According to some example embodiments, when the user equipment is configured to operate in the radio resource control connected mode, the method may further include dropping all downlink and uplink signals and channels other than the sounding reference signal within the window, dropping all the downlink and uplink signals and channels other than the sounding reference signal except a synchronization signal block within the window, dropping all non-dynamically scheduled signals and channels, or transmitting all uplink signals and channels.

In certain example embodiments, when the user equipment is configured to operate in the radio resource control inactive mode, the method may further include dropping a paging reception, and transmit the sounding reference signal within the window, stopping inter or intra frequency measurements within the window, or stopping the sounding reference signal transmission when the window at least partially overlaps with a discontinuous reception on-duration.

In certain example embodiments, apparatus 10 may include at least one processor 12, and at least one memory 14 including computer program code. The at least one memory 14 and the computer program code may be configured to, with storing instructions that, when executed by the at least one processor 12, cause the apparatus 10 to receive, from a network entity, configuration information to indicate a window which is bandwidth-part free (e.g., step 420 in FIG. 4). According to other example embodiments, the apparatus 10 may also be caused to transmit, to the network entity, a sounding reference signal in frequency hopping within the indicated window (e.g., step 430 in FIG. 4).

In certain example embodiments, the indication may configure the apparatus to dynamically or implicitly activate or deactivate the window (e.g., third option/mode). In other example embodiments, the configuration information may include at least one of a starting slot or symbol of the window, a starting slot or symbol of a first hop of the sounding reference signal in the window, an ending slot or symbol of the window, a time duration of the window, a periodicity of the window, an initial frequency location of a first hop, a number of hops to perform in the window, a mode operation number indicating different dropping rules between the sounding reference signal and other downlink or uplink channels or signals, or indicating a radio resource control state, sounding reference signal configuration information, a time gap between hops in the window, a frequency overlap between hops in the window, or a bandwidth of each hop in the window (e.g., step 420 in FIG. 4).

According to certain example embodiments, the apparatus 10 may also be caused to switch to operate under a prior activated bandwidth part rules within the window once the window has ended or once the transmission of the sounding reference signal has completed before the window ends (e.g., step 435 in FIG. 4). According to other example embodiments, the apparatus 10 may operate in one of a radio resource control connected mode, a radio resource control inactive mode, or a radio resource control idle mode within the window (e.g., step 420 in FIG. 4). According to further example embodiments, when the apparatus 10 is in the radio resource control connected mode, the apparatus 10 may also be caused to drop all downlink and uplink signals and channels other than the sounding reference signal during the window (e.g., first operation/mode, and step 425 in FIG. 4), drop all the downlink and uplink signals and channels other than the sounding reference signal except a synchronization signal block during the window (e.g., second operation/mode, and step 425 in FIG. 4), drop all non-dynamically scheduled signals and channels (e.g., third operation/mode, and step 425 in FIG. 4), or transmit all uplink signals and channels (e.g., fourth operation/mode, and step 425 in FIG. 4).

In certain example embodiments, all the downlink and uplink signals and channels other than the sounding reference signal during the window may be dropped when a dropping rule is not configured from the network entity. In other example embodiments, when the apparatus 10 is in the radio resource control inactive mode, the apparatus 10 may be caused to drop a paging reception, and transmit the sounding reference signal during the window, stop inter or intra frequency measurements during the window, or stop the sounding reference signal transmission when the window at least partially overlaps with a discontinuous reception on-duration (e.g., steps 420 and 425 in FIG. 4).

In certain example embodiments, apparatus 20 may include at least one processor 22, and at least one memory 24 including computer program code. The at least one memory 24 and the computer program code may be configured to, with storing instructions that, when executed by the at least one processor 22, cause the apparatus 20 to provide configuration information to a user equipment to indicate a window which is bandwidth-part free for uplink transmission (e.g., step 420 in FIG. 4). According to other example embodiments, the apparatus 20 may also be caused to receive, an uplink sounding reference signal in frequency hopping transmitted within the indicated window from the user equipment (e.g., step 430 in FIG. 4). In certain example embodiments, the sounding reference signal may be received without a bandwidth part.

In certain example embodiments, the apparatus 20 may also be caused to receive a request from a network element to provide to the user equipment with the configuration information of the window, and receive a request from the user equipment to provide the configuration information of the window to the user equipment. In other example embodiments, the configuration may include at least one of a starting slot or symbol of the window, a starting slot or symbol of a first hop of the reference signal in the window, an ending slot or symbol of the window, a duration of the window, a periodicity of the window, an initial frequency location of a first hop, a number of hops to perform in the window, a mode operation number indicating different dropping rules between the sounding reference signal and other downlink or uplink channels or signals, or indicating a radio resource control state, a time gap between hops in the window, a frequency overlap between hops in the window, or a bandwidth of each hop in the window (e.g., step 420 in FIG. 4).

According to certain example embodiments, the user equipment may be configured over a radio resource control protocol or via a Long-Term Evolution positioning protocol. According to other example embodiments, the apparatus 20 may also be caused to configure the window to be dynamically activated, and implicitly deactivated without an explicit indication (e.g., step 420 in FIG. 4). According to further example embodiments, the apparatus 20 may also be caused to configure the user equipment to operate in one of a radio resource control connected mode, a radio resource control inactive mode, or a radio resource control idle mode within the window (e.g., step 420 in FIG. 4).

In certain example embodiments, configuring the user equipment to operate in the radio resource control connected mode may include configuring the user equipment to drop all downlink and uplink signals and channels other than the sounding reference signal within the window (e.g., first option/mode), drop all the downlink and uplink signals and channels other than the sounding reference signal except a synchronization signal block within the window (e.g., second option/mode), drop all non-dynamically scheduled signals and channels (e.g., third option/mode), or transmit all uplink signals and channels (e.g., fourth option/mode). In some example embodiments, configuring the user equipment to operate in the radio resource control inactive mode may include configuring the user equipment to drop a paging reception, and transmit the sounding reference signal within the window, stop inter or intra frequency measurements within the window, or stop the sounding reference signal transmission when the window at least partially overlaps with a discontinuous reception on-duration. (e.g., step 420 in FIG. 4).

Figure 7:
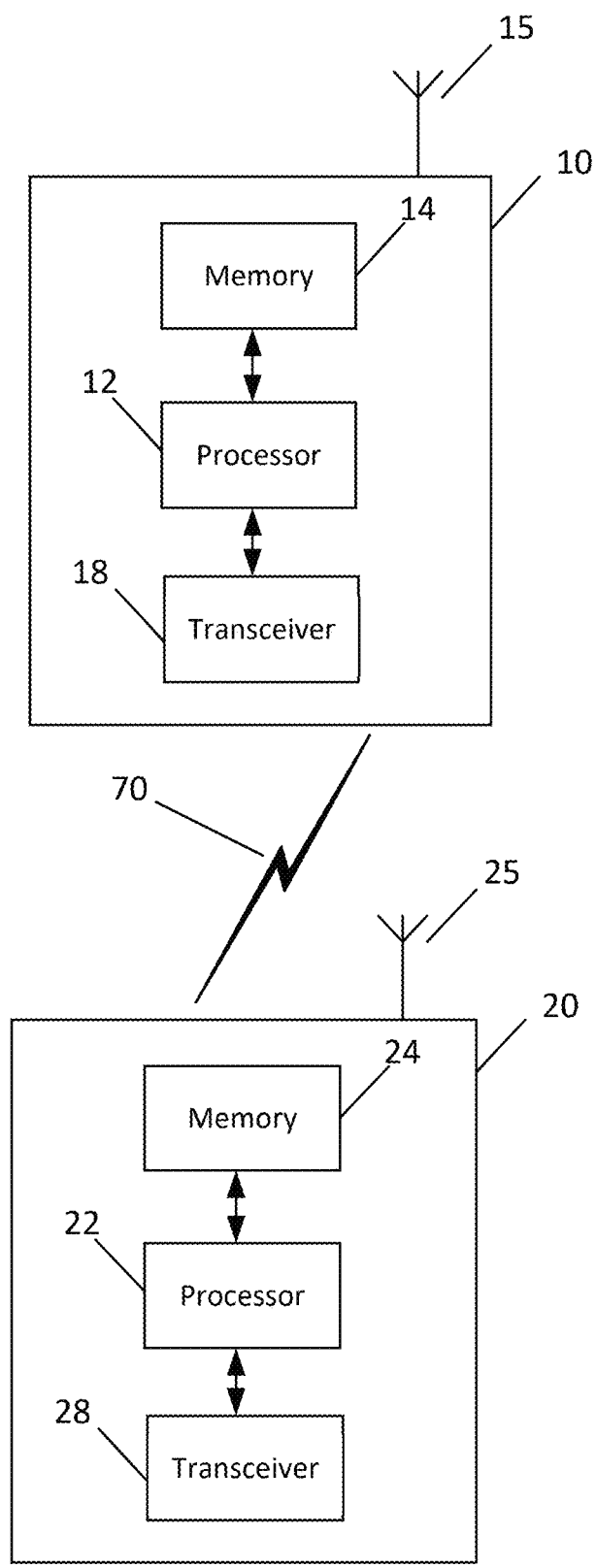
FIG. 7 illustrates a set of apparatuses, according to certain example embodiments.

FIG. 7 illustrates a set of apparatuses 10 and 20 according to certain example embodiments. In certain example embodiments, the apparatus 10 may be an element in a communications network or associated with such a network, such as a UE, mobile equipment (ME), mobile station, mobile device, stationary device, IoT device, or other device. It should be noted that one of ordinary skill in the art would understand that apparatus 10 may include components or features not shown in FIG. 7.

In some example embodiments, apparatus 10 may include one or more processors, one or more computer-readable storage medium (for example, memory, storage, or the like), one or more radio access components (for example, a modem, a transceiver, or the like), and/or a user interface. In some example embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 7.

As illustrated in the example of FIG. 8, apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 7, multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes and examples illustrated in FIGS. 1-7.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In certain example embodiments, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods and examples illustrated in FIGS. 1-5.

In some example embodiments, apparatus 10 may also include or be coupled to one or more antennas 15 for receiving a downlink signal and for transmitting via an UL from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an UL.

For instance, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some example embodiments, apparatus 10 may include an input and/or output device (I/O device). In certain example embodiments, apparatus 10 may further include a user interface, such as a graphical user interface or touchscreen.

In certain example embodiments, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to certain example embodiments, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some example embodiments, transceiver 18 may be included in or may form a part of transceiving circuitry.

For instance, in certain example embodiments, apparatus 10 may be controlled by memory 14 and processor 12 to receive, from a network entity, configuration information to indicate a window which is bandwidth-part free. Apparatus 10 may also be controlled by memory 14 and processor 12 to transmit, to the network entity, a sounding reference signal in frequency hopping within the indicated window.

As illustrated in the example of FIG. 7, apparatus 20 may be a network, core network element, or element in a communications network or associated with such a network, such as a gNB, LMF, BS, cell, or NW. It should be noted that one of ordinary skill in the art would understand that apparatus 20 may include components or features not shown in FIG. 7.

As illustrated in the example of FIG. 7, apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 7, multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes and examples illustrated in FIGS. 1-4 and 6.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In certain example embodiments, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods and examples illustrated in FIGS. 1-4 and 6.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an UL).

As such, transceiver 28 may be configured to modulate information on to a carrier waveform for transmission by the antenna(s) 25 and demodulate information received via the antenna(s) 25 for further processing by other elements of apparatus 20. In other example embodiments, transceiver 18 may be capable of transmitting and receiving signals or data directly. Additionally or alternatively, in some example embodiments, apparatus 20 may include an input and/or output device (I/O device).

In certain example embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some example embodiments, processor 22 and memory 24 may be included in or may form a part of processing circuitry or control circuitry. In addition, in some example embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

For instance, in certain example embodiments, apparatus 20 may be controlled by memory 24 and processor 22 to provide configuration information to a user equipment to indicate a window which is bandwidth-part free for uplink transmission. Apparatus 20 may also be controlled by memory 24 and processor 22 to receive, an uplink sounding reference signal in frequency hopping transmitted within the indicated window from the user equipment. According to certain example embodiments, the sounding reference signal may be received without a bandwidth part.

In some example embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of the operations.

Certain example embodiments may be directed to an apparatus that includes means for performing any of the methods described herein including, for example, means for receiving, from a network entity, configuration information to indicate a window which is bandwidth-part free. The apparatus may also include means for transmitting, to the network entity, a sounding reference signal in frequency hopping within the indicated window.

Certain example embodiments may also be directed to an apparatus that includes means for providing configuration information to a user equipment to indicate a window which is bandwidth-part free for uplink transmission. The apparatus may also include means for receiving, an uplink sounding reference signal in frequency hopping transmitted within the indicated window from the user equipment. According to certain example embodiments, the sounding reference signal may be received without a bandwidth part.

Certain example embodiments described herein provide several technical improvements, enhancements, and/or advantages. For instance, in some example embodiments, it may be possible to achieve faster SRS for positioning frequency hopping (reduced latency). In other example embodiments, it may also be possible to achieve higher positioning accuracy due to less UE movement impacting measurements.

A computer program product may include one or more computer-executable components which, when the program is run, are configured to carry out some example embodiments. The one or more computer-executable components may be at least one software code or portions of it. Modifications and configurations required for implementing functionality of certain example embodiments may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the disclosure as discussed above may be practiced with procedures in a different order, and/or with hardware elements in configurations which are different than those which are disclosed. Therefore, although the disclosure has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

PARTIAL GLOSSARY

3GPP 3rd Generation Partnership Project
5G 5th Generation
5GCN 5G Core Network
5GS 5G System
BLW BWP-less Window
BS Base Station
BW Bandwidth
BWP Bandwidth Part
DCI Downlink Control Information
DRX Discontinuous Reception
eNB Enhanced Node B
E-UTRAN Evolved UTRAN
gNB 5G or Next Generation NodeB
LPP LTE Positioning Protocol
LMF Location Management Function
LTE Long Term Evolution
MAC CE Medium Access Control-Control Element
NR New Radio
NRPPa New Radio Positioning Protocol a
NW Network
PDCCH Physical Downlink Control Channel
PDSCH Physical Downlink Shared Channel
PRS Positioning Reference Signal
PUSCH Physical Uplink Shared Channel
RedCap Reduced Capability
RRC Radio Resource Control
SPS Semi-persistent Scheduling
SRS Sounding Reference Signal
TRP Transmission Reception Point
UE User Equipment
UL Uplink

What is claimed is:

1. An apparatus, comprising:
at least one processor; and
at least one memory comprising computer program code,
the at least one memory and the computer program code configured to, with storing instructions that, when executed by the at least one processor, cause the apparatus at least to:
receive, from a network entity, configuration information to indicate a window which is bandwidth-part free, wherein the apparatus operates in one of:
a radio resource control connected mode,
a radio resource control inactive mode, or
a radio resource control idle mode within the window; and
transmit, to the network entity, a sounding reference signal in frequency hopping within the indicated window, wherein when the apparatus is in the radio resource control connected mode, the at least one memory and the computer program code are further configured to, with storing instructions that, when executed by the at least one processor, cause the apparatus at least to:
drop all downlink and uplink signals and channels other than the sounding reference signal during the window,
drop all the downlink and uplink signals and channels other than the sounding reference signal except a synchronization signal block during the window,
drop all non-dynamically scheduled signals and channels, or
transmit all uplink signals and channels.

2. The apparatus according to claim 1, wherein the indication configures the apparatus to dynamically or implicitly activate or deactivate the window.

3. The apparatus according to claim 1, wherein the configuration information comprises at least one of the following:
a starting slot or symbol of the window,
a starting slot or symbol of a first hop of the sounding reference signal in the window,
an ending slot or symbol of the window,
a time duration of the window,
a periodicity of the window,
an initial frequency location of a first hop,
a number of hops to perform in the window,
a mode operation number indicating different dropping rules between the sounding reference signal and other downlink or uplink channels or signals, or indicating a radio resource control state,
sounding reference signal configuration information,
a time gap between hops in the window,
a frequency overlap between hops in the window, or
a bandwidth of each hop in the window.

4. The apparatus according to claim 1, wherein the at least one memory and the computer program code are further configured to, with storing instructions that, when executed by the at least one processor, cause the apparatus at least to:
switch to operate under a prior activated bandwidth part rules within the window once the window has ended or once the transmission of the sounding reference signal has completed before the window ends.

5. The apparatus according to claim 1, wherein all the downlink and uplink signals and channels other than the sounding reference signal during the window are dropped when a dropping rule is not configured from the network entity.

6. The apparatus according to claim 1, wherein when the apparatus is in the radio resource control inactive mode, the at least one memory and the computer program code are further configured to, with storing instructions that, when executed by the at least one processor, cause the apparatus at least to
drop a paging reception, and transmit the sounding reference signal during the window,
stop inter or intra frequency measurements during the window, or
stop the sounding reference signal transmission when the window at least partially overlaps with a discontinuous reception on-duration.

7. An apparatus, comprising:
at least one processor; and
at least one memory comprising computer program code,
the at least one memory and the computer program code configured to, with storing instructions that, when executed by the at least one processor, cause the apparatus at least to:
provide configuration information to a user equipment to indicate a window which is bandwidth-part free for uplink transmission, wherein the configuration information configure the user equipment to operate in one of:
a radio resource control connected mode,
a radio resource control inactive mode, or
a radio resource control idle mode within the window, wherein the configuring of the user equipment to operate in the radio resource control connected mode comprises configuring the user equipment to:

drop all downlink and uplink signals and channels other than the sounding reference signal within the window, drop all the downlink and uplink signals and channels other than the sounding reference signal except a synchronization signal block within the window, drop all non-dynamically scheduled signals and channels, or transmit all uplink signals and channels; and receive, an uplink sounding reference signal in frequency hopping transmitted within the indicated window from the user equipment, wherein the sounding reference signal is received without a bandwidth part.

8. The apparatus according to claim 7, wherein the at least one memory and the computer program code are further configured to, with storing instructions that, when executed by the at least one processor, cause the apparatus at least to:

receive a request from a network element to provide to the user equipment with the configuration information of the window; and receive a request from the user equipment to provide the configuration information of the window to the user equipment.

9. The apparatus according to claim 7, wherein the configuration comprises at least one of the following:
a starting slot or symbol of the window,
a starting slot or symbol of a first hop of the reference signal in the window,
an ending slot or symbol of the window,
a duration of the window,
a periodicity of the window,
an initial frequency location of a first hop,
a number of hops to perform in the window,
a mode operation number indicating different dropping rules between the sounding reference signal and other downlink or uplink channels or signals, or indicating a radio resource control state,
a time gap between hops in the window,
a frequency overlap between hops in the window, or
a bandwidth of each hop in the window.

10. The apparatus according to claim 7, wherein the user equipment is configured over a radio resource control protocol or via a Long-Term Evolution positioning protocol.

11. The apparatus according to claim 7, wherein the at least one memory and the computer program code are further configured to, with storing instructions that, when executed by the at least one processor, cause the apparatus at least to:
configure the window to be dynamically activated, and implicitly deactivated without an explicit indication.

12. The apparatus according to claim 7, wherein the window is shared with one or more neighboring element within a network.

13. The apparatus according to claim 7, wherein configuring the user equipment to operate in the radio resource control inactive mode comprises configuring the user equipment to:
drop a paging reception, and transmit the sounding reference signal within the window,
stop inter or intra frequency measurements within the window, or
stop the sounding reference signal transmission when the window at least partially overlaps with a discontinuous reception on-duration.

14. A method, comprising:
receiving, from a network entity, configuration information to indicate a window which is bandwidth-part free, wherein the apparatus operates in one of:
a radio resource control connected mode,
a radio resource control inactive mode, or
a radio resource control idle mode within the window; and
transmitting, to the network entity, a sounding reference signal in frequency hopping within the indicated window, wherein when the apparatus is in the radio resource control connected mode, the at least one memory and the computer program code are further configured to, with storing instructions that, when executed by the at least one processor, cause the apparatus at least to:
drop all downlink and uplink signals and channels other than the sounding reference signal during the window,
drop all the downlink and uplink signals and channels other than the sounding reference signal except a synchronization signal block during the window,
drop all non-dynamically scheduled signals and channels, or
transmit all uplink signals and channels.

15. A method, comprising:
providing configuration information to a user equipment to indicate a window which is bandwidth-part free for uplink transmission, wherein the configuration information configure the user equipment to operate in one of:
a radio resource control connected mode,
a radio resource control inactive mode, or
a radio resource control idle mode within the window, wherein the configuring of the user equipment to operate in the radio resource control connected mode comprises configuring the user equipment to:
drop all downlink and uplink signals and channels other than the sounding reference signal within the window,
drop all the downlink and uplink signals and channels other than the sounding reference signal except a synchronization signal block within the window,
drop all non-dynamically scheduled signals and channels, or
transmit all uplink signals and channels; and
receiving, an uplink sounding reference signal in frequency hopping transmitted within the indicated window from the user equipment, wherein the sounding reference signal is received without a bandwidth part.

16. The method according to claim 15, further comprising:
receiving a request from a network element to provide to the user equipment with the configuration information of the window; and
receiving a request from the user equipment to provide the configuration information of the window to the user equipment.

* * * * *